J. B. BINNS.
CORE FOR TIRE CASINGS.
APPLICATION FILED MAR. 18, 1921.

1,400,258.

Patented Dec. 13, 1921.

Inventor
John B. Binns
By Percy B. Hills
Attorney

UNITED STATES PATENT OFFICE.

JOHN B. BINNS, OF AKRON, OHIO, ASSIGNOR OF ONE-FIFTH TO STEPHEN J. TAYLOR, ONE-FIFTH TO EARL WISSINGER, BOTH OF CUYAHOGA FALLS, OHIO, ONE-FIFTH TO FRANK NOLTE, OF AKRON, OHIO, AND ONE-FIFTH TO SUPERIOR RUBBER MOLD & EQUIPMENT COMPANY, OF CUYAHOGA FALLS, OHIO, A CORPORATION OF OHIO.

CORE FOR TIRE-CASINGS.

1,400,258.     Specification of Letters Patent.     Patented Dec. 13, 1921.

Application filed March 18, 1921. Serial No. 453,215.

*To all whom it may concern:*

Be it known that I, JOHN B. BINNS, a subject of the King of Great Britain, residing at Akron, county of Summit, State of Ohio, have invented certain new and useful Improvements in Cores for Tire-Casings, of which the following is a specification.

My invention relates to the manufacture of tire casings, and has for its object to provide an improved construction of tire core upon which the casing is to be built, and afterward vulcanized, said core being provided with means for admitting a fluid, such as air, water or steam, between the exterior of the core and the interior of the casing, whereby a pressure will be exerted between the core and the casing to take up the stretch which takes place, both in fabric and cord tires, while they are being cured.

This object I accomplish in the manner and by the means hereinafter described and claimed, reference being had to the accompanying drawing, in which:—

Figure 1:
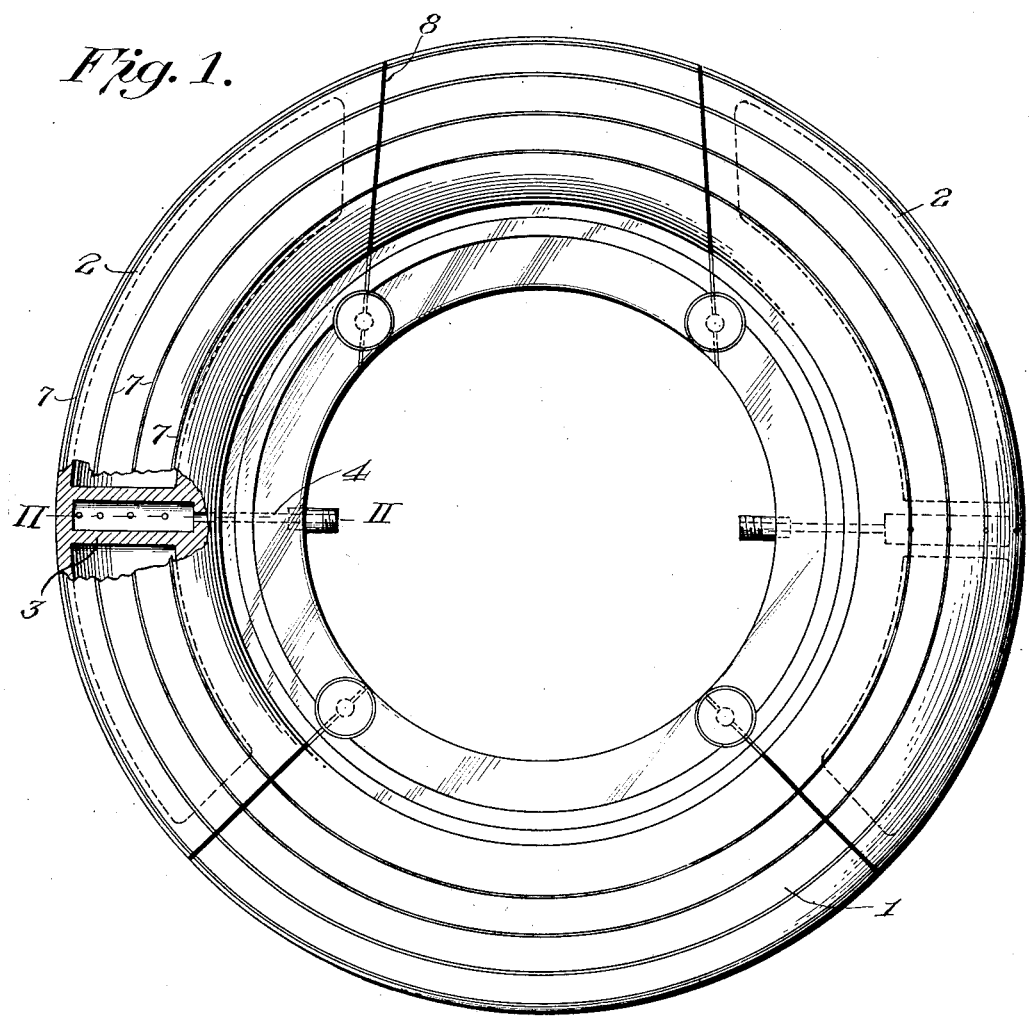
Figure 1 is a side elevation of my improved core, the same being shown partly broken away.
Figure 2:
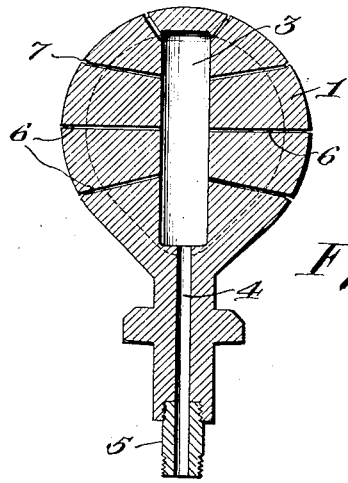
Fig. 2 is a transverse section taken on the line II—II of Fig. 1.

In the said drawing, reference being had more particularly to Figs. 1 and 2, the reference numeral 1 denotes the body of the core, which is shown made up in sections adapted to be collapsed in the usual manner. Some or all of these sections are formed hollow at 2 in the usual manner to lighten the weight of the same, and one or more of said sections is formed with an integral chamber 3 into which communicates a passage-way 4, leading through the bead of the core, said passage-way being internally screw-threaded to receive a nipple 5, as clearly shown in Fig. 2. Leading radially from the chamber or chambers 3 are a plurality of ducts 6, said ducts communicating with a series of exterior grooves 7 formed on the sections of the core, and registering with each other to form a series of circumferential grooves therearound. The tire casing built up on said core may be clamped firmly at the bead line to prevent the escape of fluid at that point, and in order that there may be no escape between the sections of the core, I provide a suitable packing 8, as shown.

In operation, the tire casing having been built or assembled upon the core, and during the vulcanization operation fluid is admitted through the nipple or nipples 5 to the chamber or chambers 3, from whence it will pass through the ducts 6 to the grooves 7, thus exerting the desired pressure upon the inside of the tire casing, said pressure, due to the annular arrangement of said grooves 7, extending entirely around the core.

Figure 3:
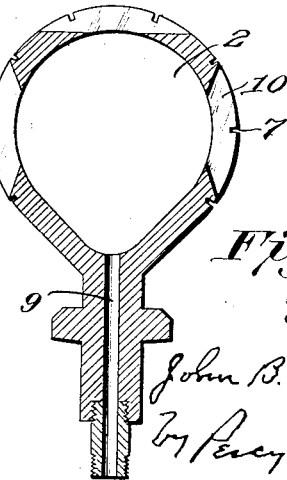
Fig. 3 is a view similar to Fig. 2, illustrating a modified construction.

In Fig. 3 I have shown a modified form wherein the chamber or chambers 3 are dispensed with, a duct 9 leading direct to the interior chamber 2 of one or more of the sections of the core, said core sections having formed therein a plurality of narrow slots 10 communicating with the chambers 2, whereby the fluid will be permitted to escape to the exterior of the core. By providing these narrow slots 10, it will be apparent that the same readily may be cleared, should they become clogged, by the insertion of a knife blade, or similar narrow object, said construction possessing obvious advantages over the minute ducts disclosed in the construction shown in Figs. 1 and 2. If desired, the circumferential grooves 7 may be provided on the exterior of the core sections, though these grooves are not essential.

While I have shown my invention applied to a sectional core, it will be understood that it is equally applicable to an integral core, such as is used in the manufacture of smaller sized clencher tire casings.

Having thus fully described my invention, what I claim as new and desire to secure by Letters Patent, is:—

1. A core for tire casings, formed with a series of circumferential grooves in its casing receiving surface, and means for admitting a fluid to said grooves.

2. A core for tire casings, formed with a series of circumferential grooves in its casing receiving surface, a chamber in said core communicating with said grooves, and means for supplying fluid to said chamber.

3. A core for tire casings, formed with a series of circumferential grooves in its casing receiving surface, a chamber in said core, ducts leading from said chamber to said grooves, and means for supplying fluid to said chamber.

4. A core for tire casings, formed with a series of circumferential grooves in its casing receiving surface, a chamber in said core, ducts leading from said chamber to said grooves, and a passage-way through the bead of said core communicating with said chamber, whereby fluid may be supplied thereto.

5. A core for tire casings, comprising a plurality of separate sections each closed at their ends to form chambers therein, said sections being provided with a series of circumferential grooves registering with each other when said sections are assembled, ducts leading from the chamber of one of said sections into its grooves, and a passage-way through the bead of said sections communicating with said chamber whereby fluid may be supplied thereto.

6. A hollow core for tire casings, comprising means for supplying fluid to the interior thereof, and a series of narrow elongated slots in said core communicating with the interior thereof.

In testimony whereof, I hereunto affix my signature.

JOHN B. BINNS.